Sept. 8, 1953 E. N. BURNETT 2,651,153
ASSEMBLING AND GLUING FOR INTERLOCKING CONTAINERS
Filed Oct. 3, 1950 11 Sheets-Sheet 1
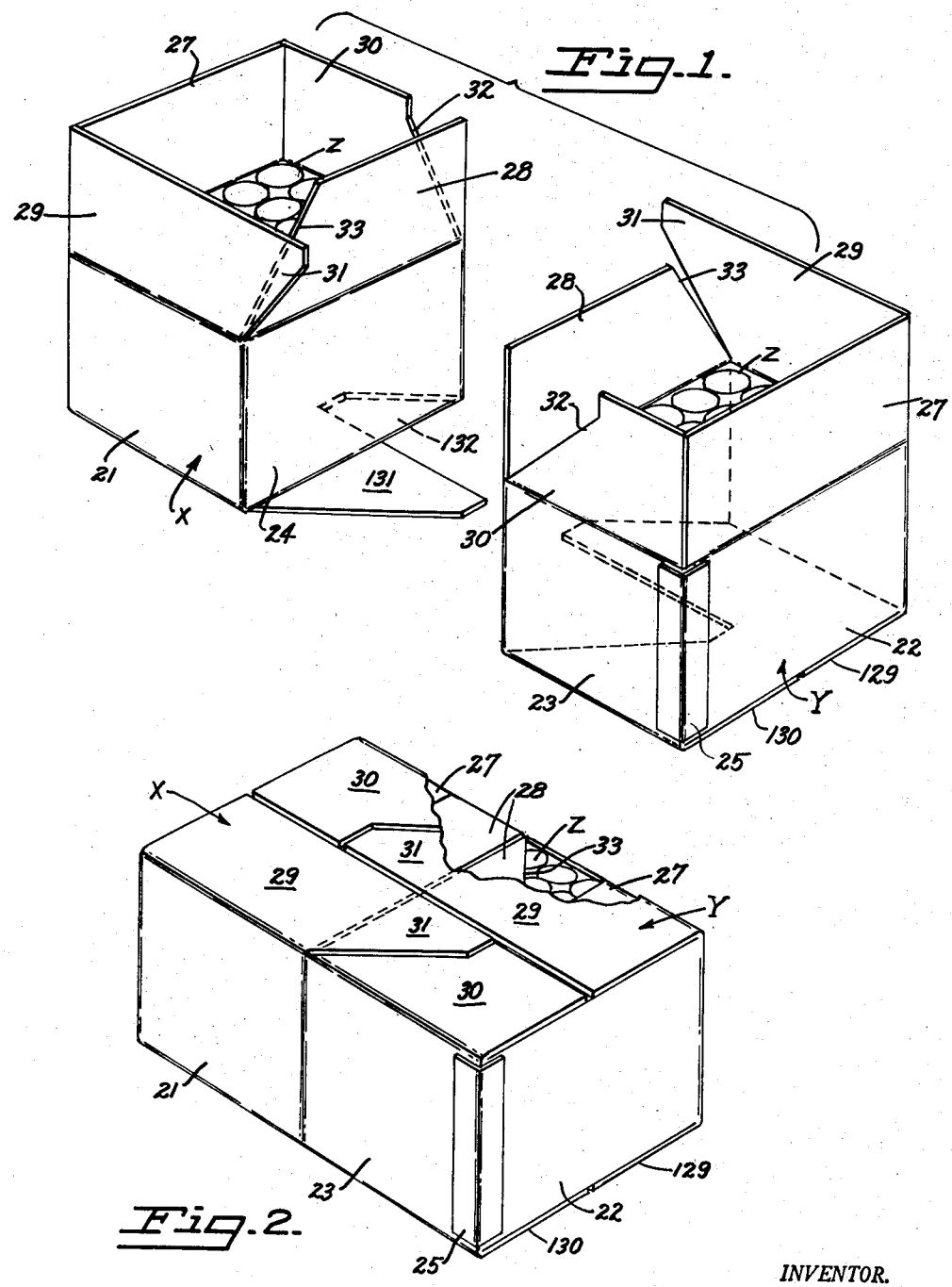
INVENTOR.
EDWARD N. BURNETT
BY
Townsend and Townsend
ATTORNEYS

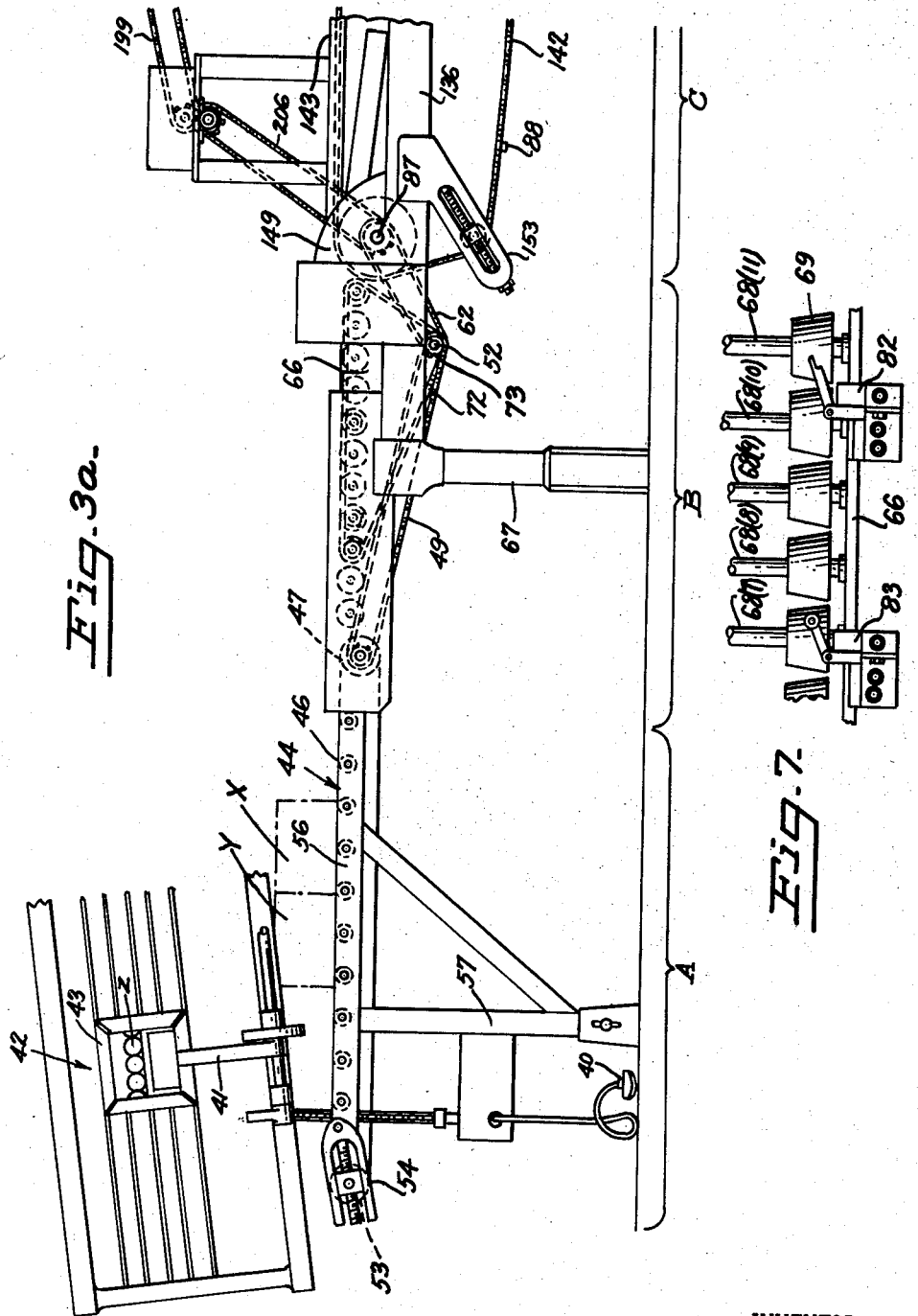

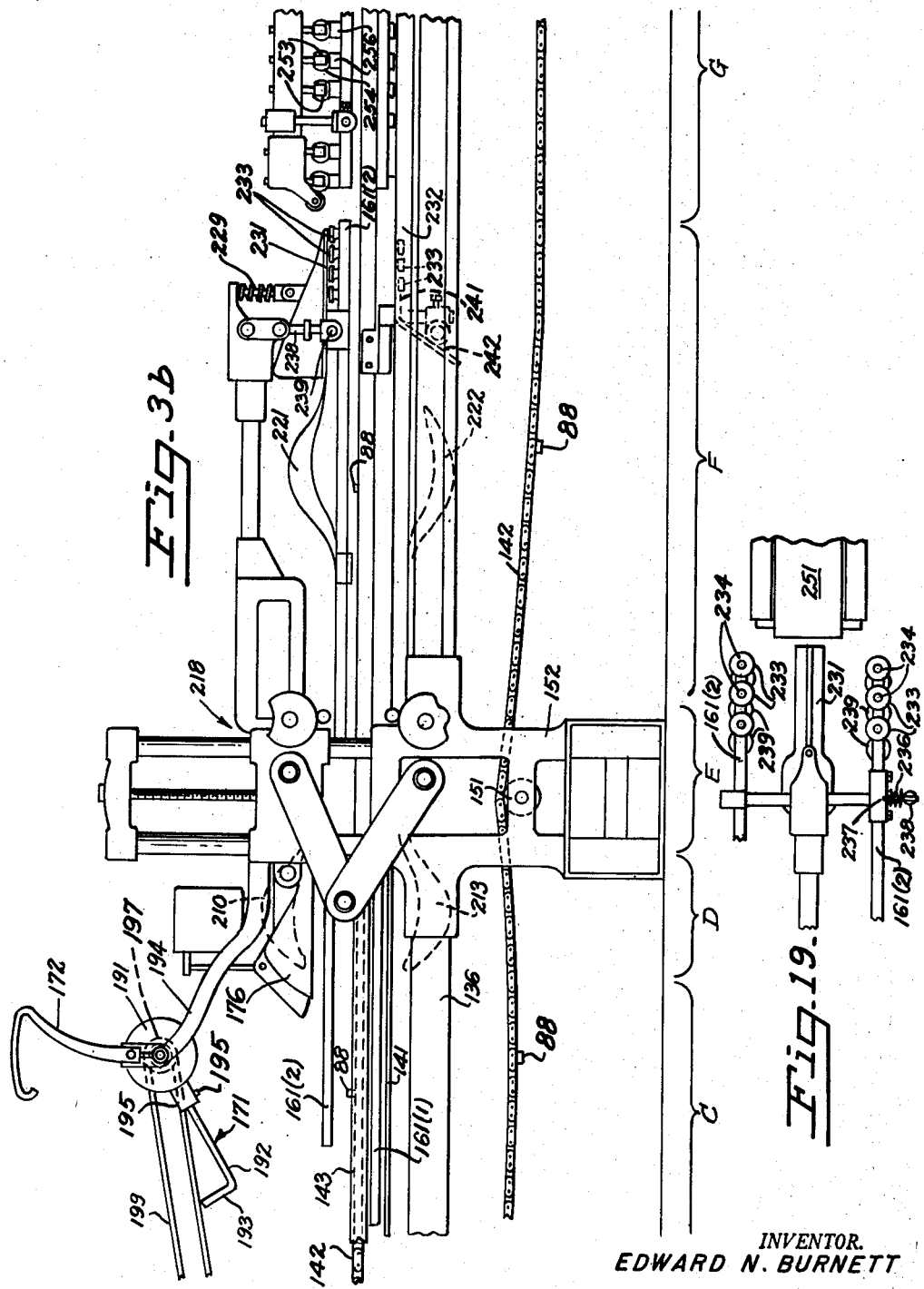

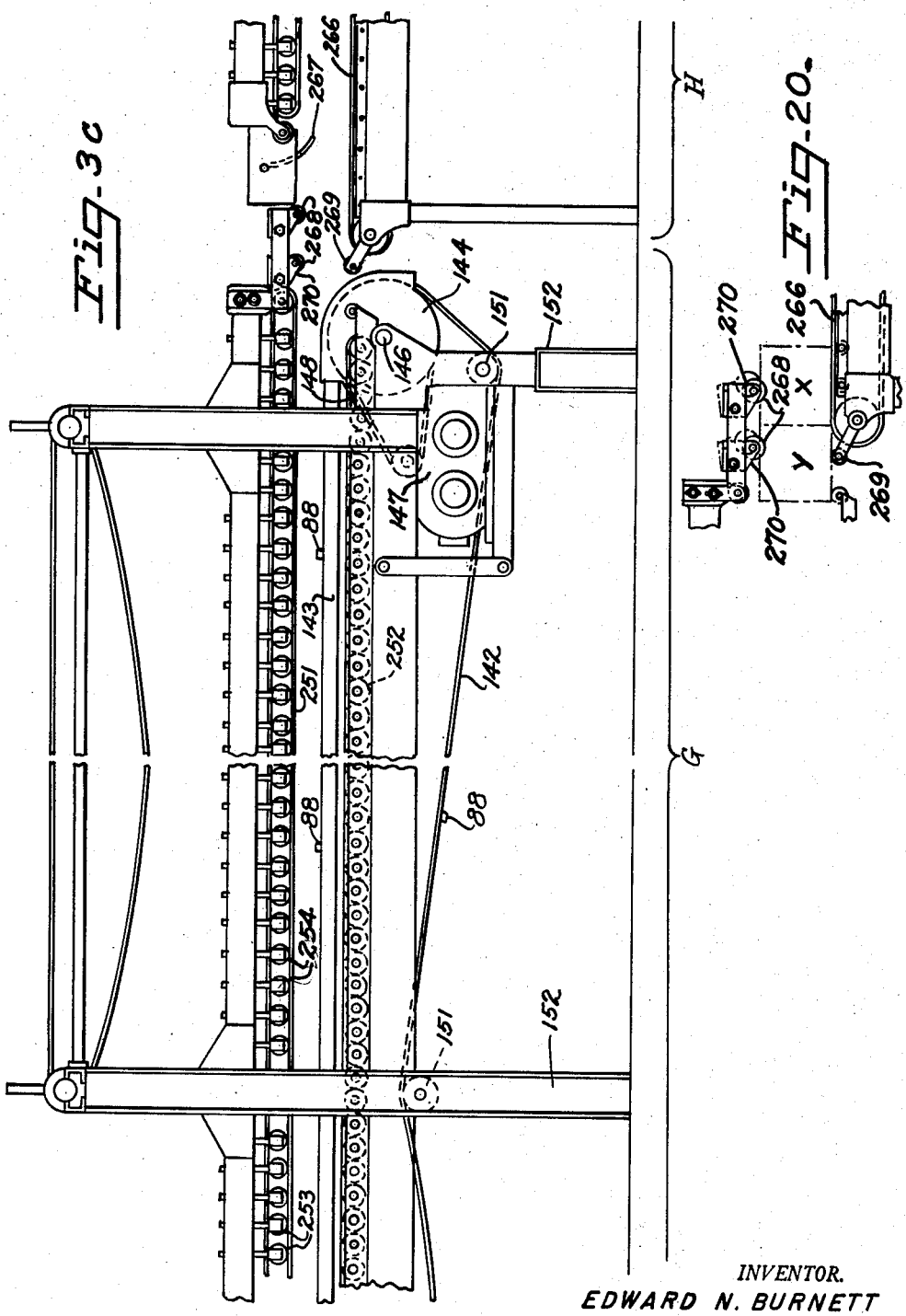

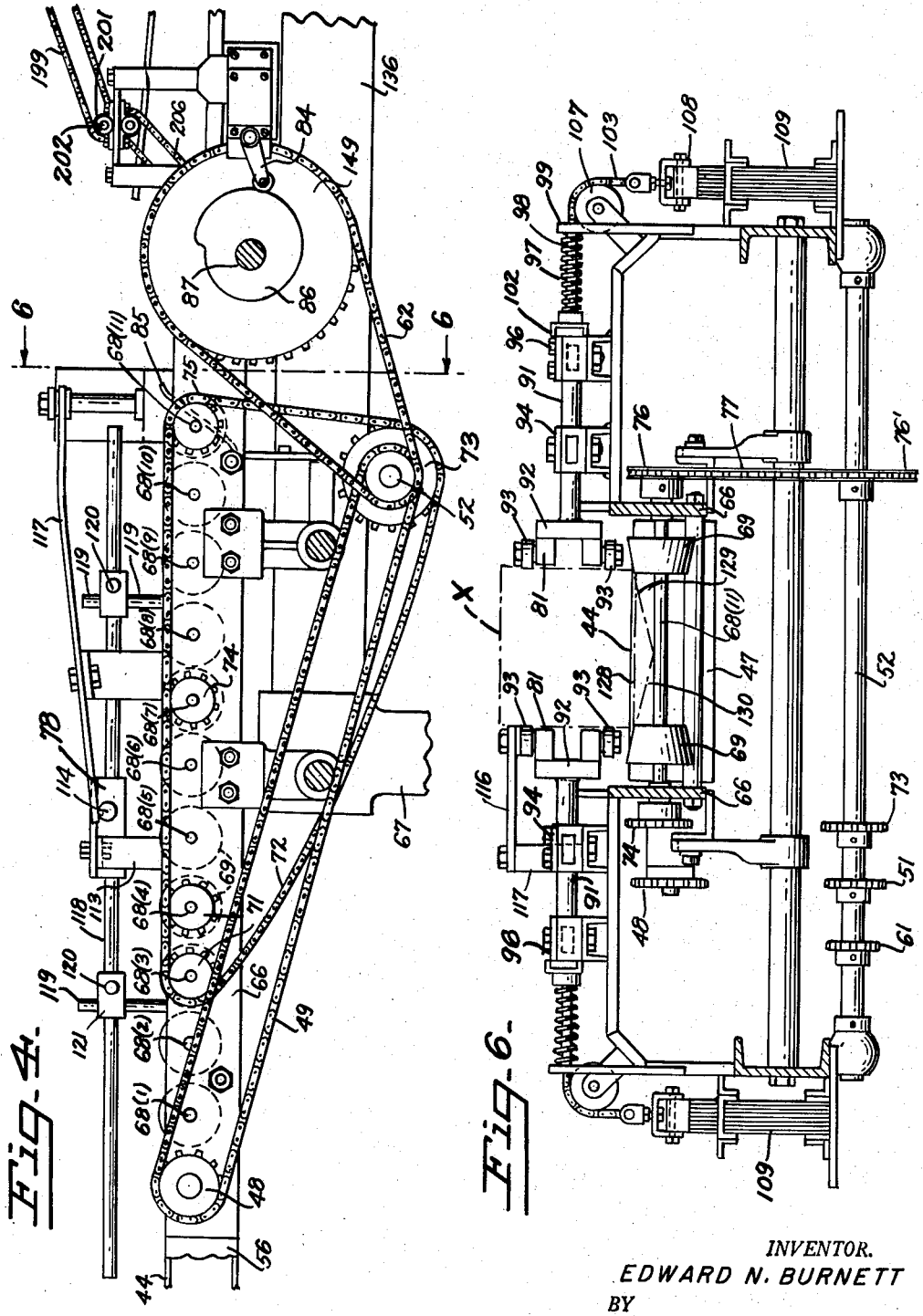

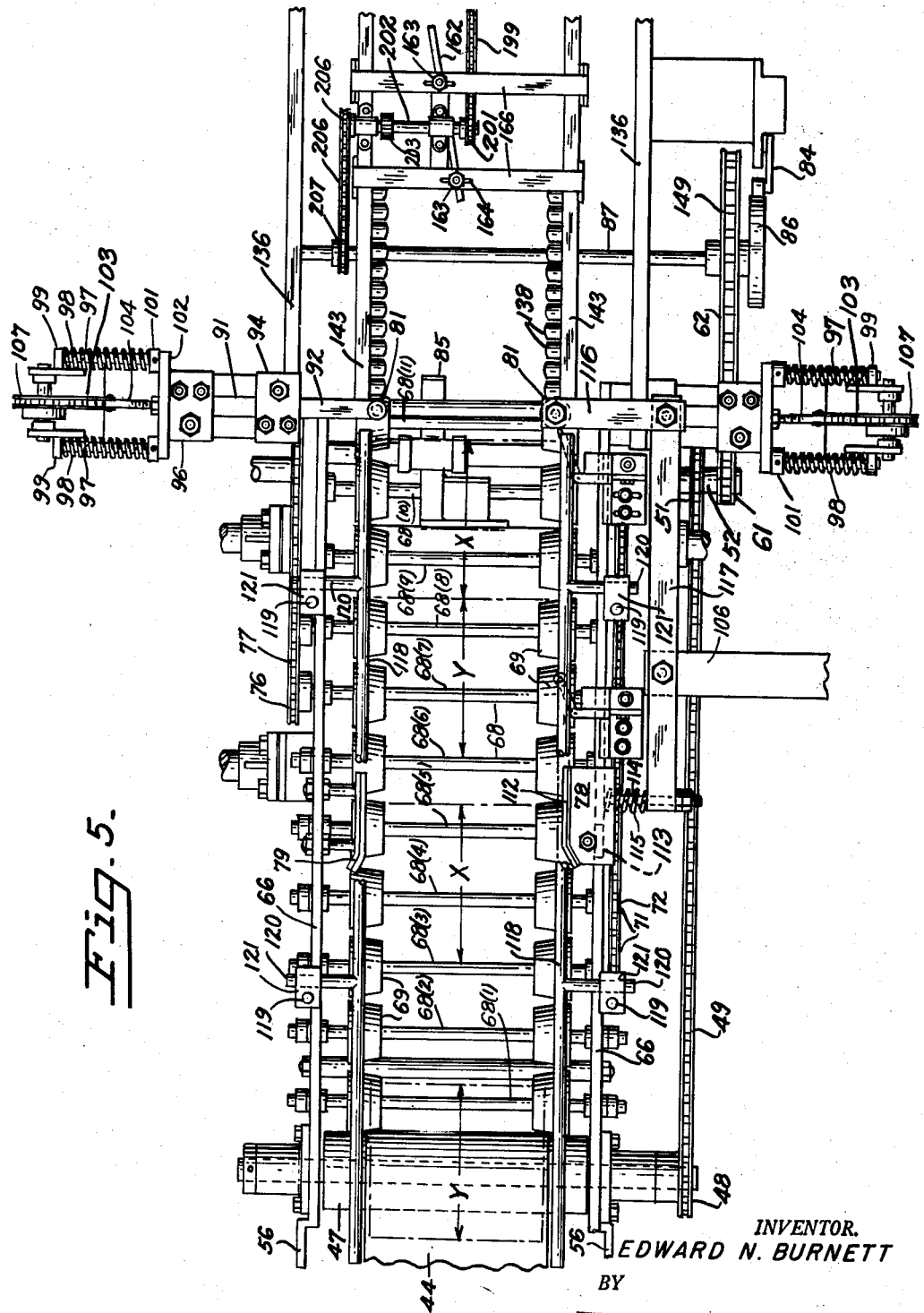

INVENTOR.
EDWARD N. BURNETT
BY
Townsend and Townsend
ATTORNEYS

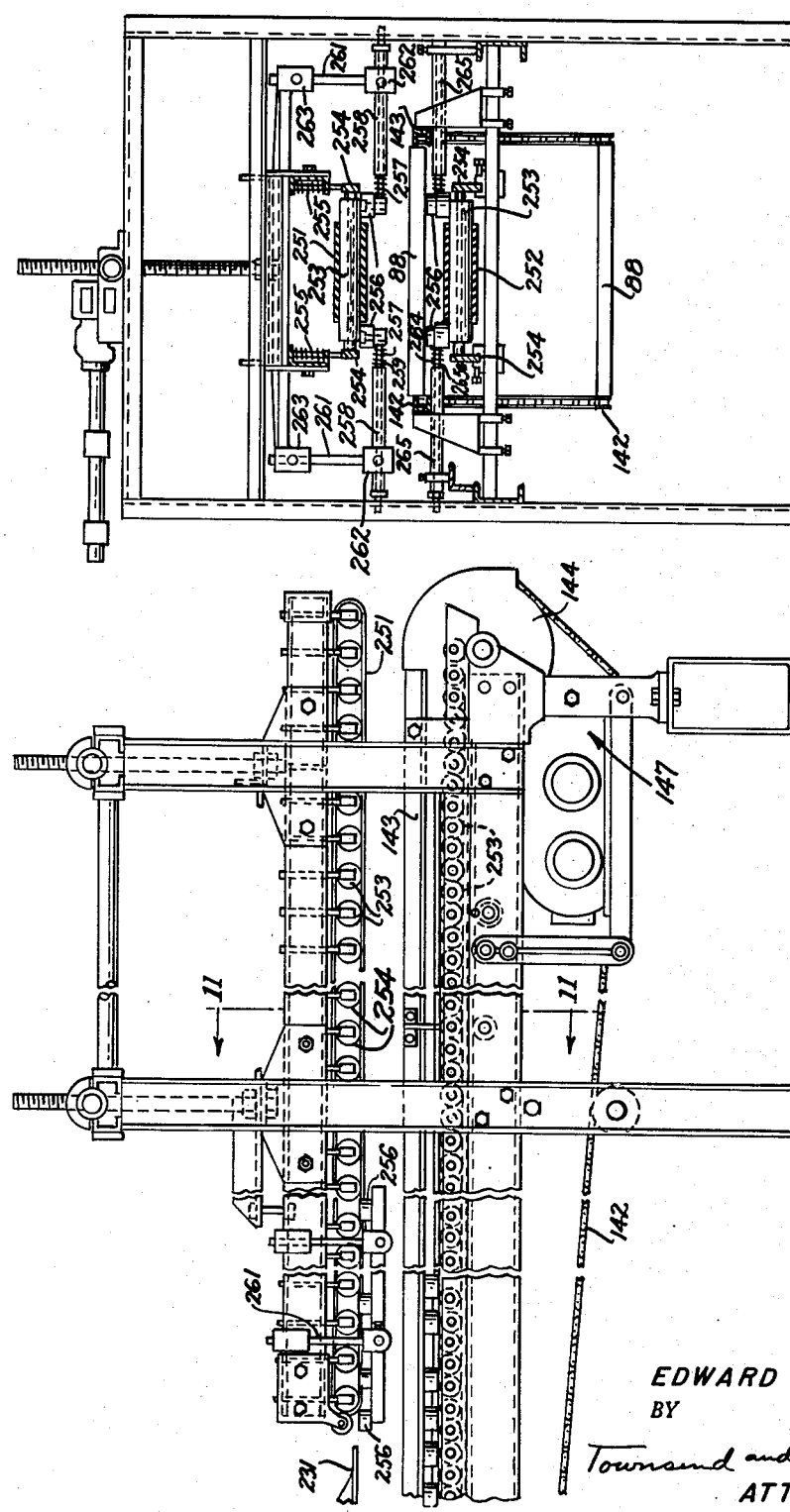

Sept. 8, 1953         E. N. BURNETT         2,651,153
ASSEMBLING AND GLUING FOR INTERLOCKING CONTAINERS
Filed Oct. 3, 1950         11 Sheets-Sheet 9
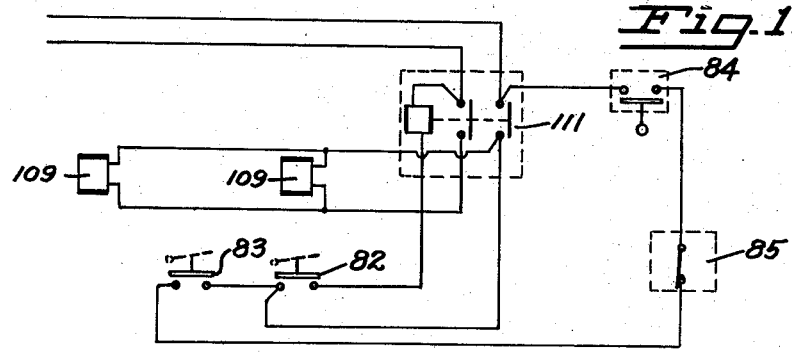
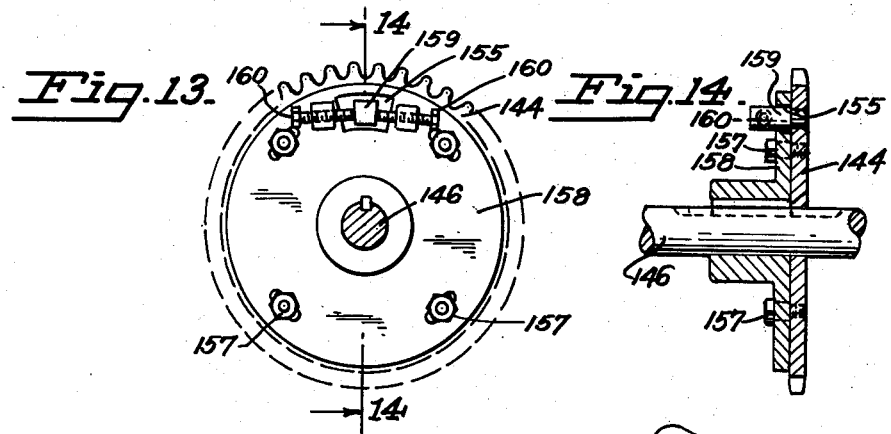
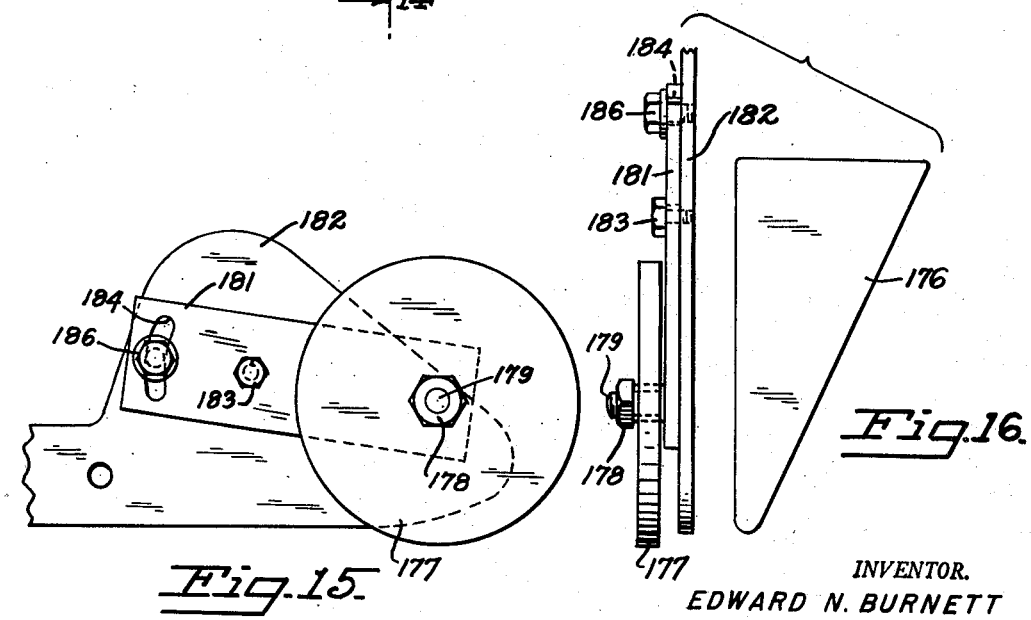
INVENTOR.
EDWARD N. BURNETT
BY
Townsend and Townsend
ATTORNEYS Sept. 8, 1953     E. N. BURNETT     2,651,153
ASSEMBLING AND GLUING FOR INTERLOCKING CONTAINERS
Filed Oct. 3, 1950     11 Sheets-Sheet 10
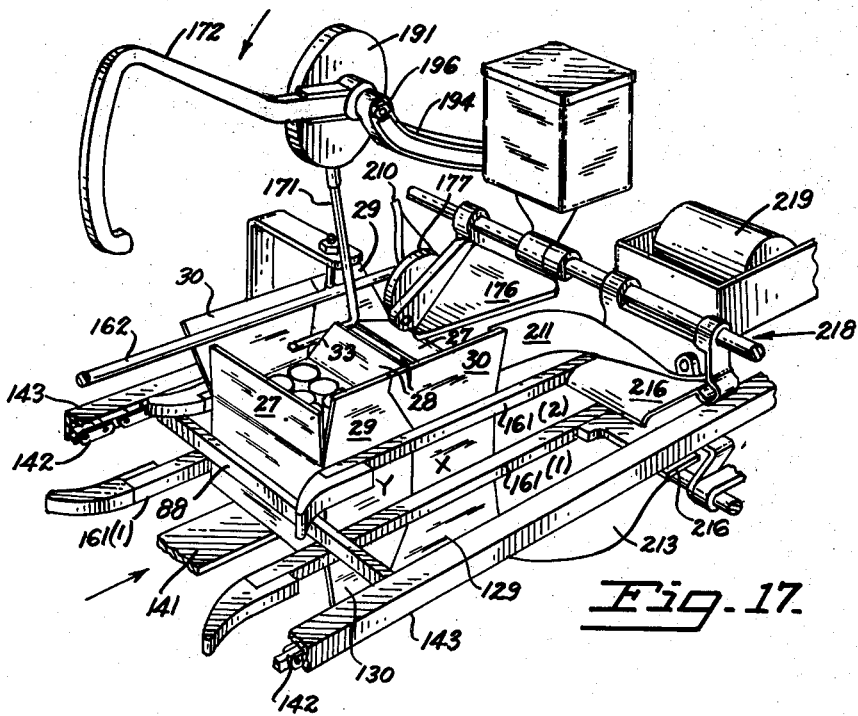
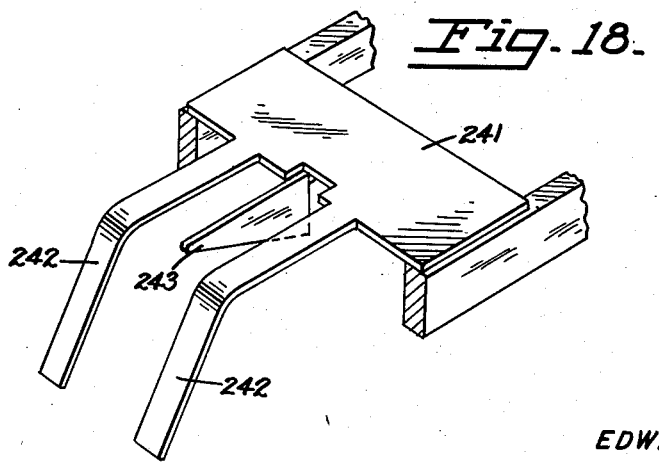
INVENTOR.
EDWARD N. BURNETT
BY
Townsend and Townsend
ATTORNEYS Sept. 8, 1953          E. N. BURNETT          2,651,153
ASSEMBLING AND GLUING FOR INTERLOCKING CONTAINERS
Filed Oct. 3, 1950          11 Sheets-Sheet 11

INVENTOR.
EDWARD N. BURNETT
BY
Townsend and Townsend
ATTORNEYS

UNITED STATES PATENT OFFICE 2,651,153

ASSEMBLING AND GLUING FOR INTERLOCKING CONTAINERS

Edward N. Burnett, San Lorenzo, Calif., assignor to Gerber Products Company, Fremont, Mich., a corporation of Michigan Application October 3, 1950, Serial No. 188,254

18 Claims. (Cl. 53—3)

This invention relates to new and useful improvements in methods and apparatuses for assembly of interlocking containers. More particularly, the invention relates to new and useful methods and machinery for assembling and gluing pairs of interlocking container units, such as those disclosed in my copending patent application for Container Construction, Serial No. 141,150, filed January 26, 1950.

Said copending application discloses novel container constructions in which two or more units are adapted to be interlocked together, one of the outer cover flaps of each unit having an integral projecting tongue and the other outer cover flap of each unit having a corresponding recess receiving the tongue of the opposed unit. The top and bottom construction of the units are identical. Glue is applied to the undersurface of each tongue which adheres to the top surface of inner flaps which are exposed by reason of the recess cut in the outer flap which receives the tongue of the opposed box unit. The details of such box units are more completely described hereinafter in the body of the specification of this application.

The instant invention has for its principal object the assembly and gluing of pairs of such container units. It will be assumed that the blank for each box unit has been folded at successive 90° angles along score lines therein provided as set forth in my said copending applications and that the meeting edges of the side panels have been joined by means of a strip of adhesive tape or other suitable attaching means to hold the adjacent panels together. The operator of the machine hereinafter described then forms a temporary bottom for each unit by folding down all of the flaps thereof, but no glue is applied at this stage of the assembly of the unit. Each unit is then filled with containers by means of a packing machine of substantially standard construction. The machine which is the subject of this invention then performs the following steps:

(A) Each filled unit is packed, deposited on a conveyor belt and transported into the machine.

(B) Corresponding pairs of units are grouped together, the machine being so constructed that two units are positioned with their opposed sides abutting and are so conveyed that the two units proceed through the machine in such position. The timing of this station of the machine is such as to insure that units are paired together, and, if they are not so paired, further progress through the machine is halted until adjustment is made. After release from this station, the units are advanced through subsequent stages by a pusher bar bearing against the rear of the rearmost unit, release from the grouping station being timed to movement of said bar.

(C) The inner top flaps of each unit are forced downwardly so that they are horizontal and overlie the contents of the container.

(D) The outer top and bottom flaps are folded outward so that they assume a horizontal position projecting away from the container.

(E) Glue is applied to the undersurfaces of the outer top and bottom flaps.

(F) The outer top and bottom flaps are folded inwardly so that they are horizontal and overlie the container.

(G) The container is subjected to compression so that the glue causes the outer flaps of both the top and the bottom of each unit to adhere to the inner flaps thereof, the projecting tongues of one unit adhering to the portions of the inner flaps of the opposite unit exposed by the cutting away of recesses in the outer flaps.

(H) Further compression is applied until the glue has set sufficiently for handling.

Further objects of the present invention will become apparent upon referring to the accompanying specification and drawings in which similar characters of reference represent corresponding parts in the several figures of the drawings.

Fig. 1 is an exploded perspective view of two container units prior to being assembled together;

Fig. 2 is a perspective view of a pair of units as finally assembled;

Fig. 3 is a side elevation of the machine, which, by reason of the space limitations, is included on three sheets of drawings, the portions on each sheet being designated Figs. 3(a), 3(b) and 3(c);

Fig. 4 is a side elevation of the unit assembly station and adjacent mechanism;

Fig. 5 is a top plan of the structure shown in Fig. 4.

Fig. 6 is a vertical section taken substantially along the line 6—6 of Fig. 4;

Fig. 7 is a fragmentary view of a portion of the unit assembly station showing the location of switches actuating the mechanism releasing pairs of units from this station;

Fig. 10 is a side elevation of the first compression station;

Fig. 11 is a vertical section taken substantially along the line 11—11 of Fig. 10;

Fig. 12 is a wiring diagram of certain electrical circuits employed in the unit assembly station;

Fig. 13 is a side elevation of an adjustable sprocket located at the forward end of the first compression unit;

Fig. 14 is a section taken along the line 14—14 of Fig. 13.

Fig. 15 is a side elevation of a roller and mounting mechanism which is a part of the inner top flap closing station;

Fig. 16 is a top plan of the structure shown in Fig. 15;

Fig. 17 is a perspective view of the inner top flap closing station;

Fig. 18 is a perspective of a portion of the forward end of the outer flap refolding station;

Fig. 19 is a top plan of a portion of the forward end of the outer flap refolding station;

Fig. 20 is a side elevation of a portion of the forward end of the first compression station.

Figure 9:
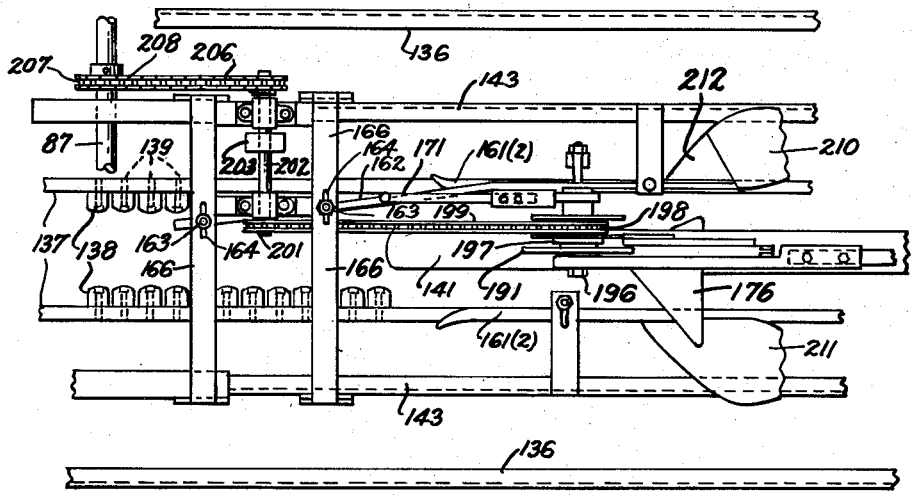
Fig. 9 is a top plan view of the structure shown in Fig. 8.

Figs. 21 to 28, inclusive, are diagrammatic longitudinal vertical mid-sections of a pair of container units shown at various stages in their progress through the machine.

Referring now to Figs. 1 and 2 there is illustrated a container construction such as that disclosed and set forth in my aforementioned patent application, Serial No. 141,150, filed January 28, 1950. It will be seen that the construction comprises two interlocking box units indicated generally by reference numerals X and Y, formed of corrugated paper or other suitable material. Fig. 1 is an exploded view of the two units prior to being assembled together. In Fig. 2 the two units are shown in interlocked position. The sides of each box unit form a rectangle in cross-section, the respective sides of which are indicated by reference numerals 21, 22, 23, and 24. The meeting edges of panels 22 and 23 are held together by a strip of gummed tape 25. The inner flaps of the top of each unit, which constitute extensions of side members 22 and 24, respectively, are designated by reference numerals 27 and 28. Said inner flaps are folded on horizontal score lines disposed transverse to the direction of movement of the units through the machine. Said flaps meet along the center of the box unit when folded horizontal in completed form. The outer flaps of the tops of each of the units are designated by reference numerals 29 and 30 and constitute, respectively, extensions of side members 21 and 23. Said outer flaps are folded on horizontal score lines disposed parallel to the direction of movement of the units through the machine. Outer top flap member 29 has a projecting tongue 31 which projects out beyond the outline of side 24. Outer top flap member 30 has a corresponding recess 32 cut therein which is dimensioned and positioned to receive the projecting tongue 31 of the opposite box unit. By reason of the cutting away of the recess 32 in outer flap 30, a portion of inner flap 28 is exposed prior to assembly of the two units together, and when glue is applied to the underside of the projecting tongue 31, tongue 31 of one unit and flap 28 of the cooperating unit are joined and held together. One further feature of the structure of the box units should be pointed out and that is that, as most clearly shown in Fig. 1, one corner 33 of the inner top flap member 28 is cut away to provide stock for the projecting tongue 31. This feature is illustrated and described in greater detail in my said application, Serial No. 141,150. The fact that said corner is cut away at 33 is utilized in the assembly of the box units as hereinafter more fully appears.

It will be understood that the bottom of each box unit X and Y likewise is formed with two inner flaps 127 and 128 and two outer flaps 129 and 130 and that outer flap 129 of each unit is provided with a projecting tongue 131, and outer flap 130 of each unit is provided with a corresponding recess 132 to receive the tongue 131 of the opposite box unit.

Although the machine which constitutes the subject of this invention may be used to close containers of other construction, said machine is most particularly adapted for closing the containers hereinbefore described.

The machine which comprises the subject matter of the invention is particularly designed for packing containers for small metal cans, such as baby food cans Z wherein twenty-four such cans are placed inside each unit X or Y and the combined pair of two container units contains forty-eight cans. It will be understood that the machine may readily be adapted for container units dimensioned to receive cans or glass jars and the like of other dimensions and of different numbers.

The machine which constitutes the subject of this invention comprises a plurality of sections as hereinafter set forth:

A. Packer station of standard construction, as well understood in the art to which this invention pertains. Twenty-four cans are simultaneously and automatically inserted in each unit X or Y.

B. Unit assembly station wherein each unit is centered laterally of the machine and the two units of each pair are brought together so that the opposed sides are abutting. At this station controls are provided so that single units will not proceed through the machine separately but that each pair will be grouped together and moved through the machine together.

C. Inner top flap closing station wherein the inner top flaps are folded down so that they assume a horizontal position overlying the contents of the container.

D. Top and bottom outer flap unfolding station. The outer flaps are folded backward until they extend horizontally away from the containers.

E. Gluing station wherein glue is applied to the under surfaces of the outer flaps.

F. Outer flap refolding station wherein the outer top flaps and the outer bottom flaps are folded back so that they assume a horizontal position overlying the inner top and bottom flaps respectively.

G. First compression station wherein the pairs of units are moved by the conveyor bars through a compression unit which applies force to the top and bottom of the box so that the glue will adhere.

H. Second compression station wherein further compression is applied. The units are moved through the machine by conveyor belts in conventional manner.

A. *Packer station*

This section of the machine is standard in construction and the details thereof are well known in this art as exemplified by U. S. Letters Patent 2,043,411 issued June 9, 1936, and 2,116,793 issued May 10, 1938. Box unit X or Y first is manually formed in rectangular shape and the bottom inner flaps 127 and 128 folded down and the bottom outer flaps 129 and 130 folded over said inner flaps, and the top flaps 27, 28, 29 and 30 are open, or substantially vertical (see Fig. 1). The operator places the unit against the funnel or magazine 43 of filler 42. The details of construction whereby twenty-four baby food or other cans are simultaneously inserted into each unit are well understood and constitute no part of the instant invention. After each unit X or Y has been filled, the pivoted arm 41 is retracted by the operator by actuation of pedal 40 so that the unit stands upright, and the operator manually transfers the unit to endless moving belt 44 which conveys the unit into the machine. The operator positions the box units on belt 44 so that the leading unit X is positioned with tongues 31 and 131 projecting rearwardly and the next unit in order, Y, is positioned with tongues 31 and 131 projecting forwardly so that units X and Y may be properly joined together. If the operator errs so that the tongues 31 and 131 of unit X extend forwardly, a switch, hereinafter described, prevents further progress through the machines. The top stretch of said belt 44 is held substantially horizontally disposed by a plurality of horizontal idler rollers 46 having their axes transverse to the direction of movement of belt 44. The belt 44 is driven by driving roller 47 around which the belt 44 passes at its forward end. Said driving roller 47 bears a sprocket 48 at one end thereof which is connected by chain 49 to sprocket 51 on shaft 52. A second roller 53 is provided at the opposite end of the conveyor belt 44 and said belt passes around said roller 53 at its rearward end. An adjustment device 54, as well understood in this art, is provided to move said roller 53 relative to roller 47 and thereby tighten belt 46. Rollers 44, 47, and 53 are all journaled in horizontal frame members 56 which extend longitudinally of the machine and said frame members are supported by standards 57.

Shaft 52 is driven by means of sprocket 61 over which passes chain 62 which, in turn, is driven by sprocket 149 on shaft 87, as hereinafter appears.

B. Unit assembly station

At this station, shown in detail in Figs. 4 to 7, the pairs of box units X and Y are assembled together so that their side panels 24 abut and the tongues 31 and 131 of each unit overlap the opposite unit. It is very important that each pair of units be accurately assembled with said sides 24 abutting and the units square with respect to each other since this relationship insures proper sealing and interlocking of the units and prevents the units from breaking apart during subsequent transportation, a result which would otherwise occur.

Accordingly, there are provided on opposite sides of the machine, horizontally disposed side members 66, which constitute extensions of the side members 56 of the packer station. Said side members 66 are supported by standards, 67, the height whereof being adjustable as well understood in this art. Eleven horizontally disposed shafts 68 extending transversely across the machine are rotatably mounted in said side members 66, the axes of all said shafts being level. Each shaft 68 bears at each side of the machine a frusto-conical roller 69, fixed for rotation with its shaft 68, the smaller end of the roller being directed inwardly. Opposed rollers 69 are spaced apart a distance such that as the box units are discharged from conveyor belt 44 the opposite bottom side edges are supported by said frusto-conical rollers. In this manner the outer bottom flaps 129 and 130 sag slightly downward so as to assume an acute angle with respect to the bottom inner flaps 127 and 128. This insures that the tongues 131 will overlap the opposite box unit; it also insures that the platen of the gluer, hereinafter described, will pass under the outer flaps 129 and 130 so as to permit folding backward of said outer flaps during passage through the gluer.

In order to insure proper passage of the units through the machine, as hereinafter appears, certain of shafts 68 are power driven and others are idlers. Thus the first two shafts are idlers 68(1) and 68(2); the next two shafts 68(3) and 68(4) are driven in unison; the next two shafts 68(5) and 68(6) are idlers; and the last five shafts 68(7) to 68(11) are power driven in unison. Shafts 68(3) and 68(4) each bears a sprocket 71 at one end which are driven by chain 72 which in turn passes over sprocket 73 on shaft 52. Shaft 68(7) bears an idler sprocket 74 at one end over which passes chain 72. The opposite end of shaft 68(7) and the corresponding ends of each of shafts 68(8), (9), and (10) bear sprockets 76 over which passes chain 77 driven by sprocket 76' on shaft 52, thus resulting in shafts 68(7)—68(10) turning in unison. Shaft 68(11) bears a sprocket 75 driven by chain 72, thus resulting in shaft 68(11) being driven at a slower speed than shafts 68(7)—68(10).

Preferably shafts 68 are spaced apart a distance such that a single box unit X is of a length two and one-half times the distance between centers of shafts 68. This spacing plus the alternation of driven and idler shafts 68 facilitates proper passage of the units through the machine. By timing mechanism hereinafter described, the leading edge of each leading unit X is held immediately above the center of shaft 68(11) until the trailing unit Y abuts unit X. Unit Y is pushed against unit X by a succeeding unit, which succeeding unit is urged forward by driven rollers 69 on shafts 68(3) and 68(4). Upon actuation of certain switches, later described, units X and Y are released and driven forward by driven rollers 69 on shafts 68(7)—68(11). Any tendency of the succeeding unit to follow after unit Y is prevented by reason of the fact that shafts 68(5) and 68(6) are not driven and thus the succeeding unit comes to rest. A brake 78, which is likewise described in detail below, further assists in preventing the succeeding unit from following unit Y.

Similarly as a unit comes off the conveyor belt 44 it is pushed forward by the succeeding unit until it is itself advanced by the rollers 69 on shafts 68(3) and 68(4) and in turn then pushes forward the unit ahead which is over the idler rollers 69 on shafts 68(5) and 68(6). The result is that there is a gap between each unit except the abutting pair of units X and Y. The gaps between the other units permit entry of mechanism to stop the units and prevents "ganging" of the units through the machine.

As has been stated, timing devices are incorporated in this section of the machine so that units X and Y are collected as a pair and each pair moves through the machine together. Accordingly, stop members 81 are provided on opposite sides of the machine to hold the leading edges of the leading unit X. Four switches 82, 83, 84, and 85 are provided and an electrical circuit is established so that when each of said switches is closed, stop members 81 are retracted and the pair of units previously held thereby permitted to proceed through the machine. Limit switch 82 is provided adjacent stop members 81 and when the leading edge of the leading unit X comes to rest and is held by stop member 81 said switch 82 is closed. Limit switch 83 is provided so that when the leading edge of the trailing unit Y of each pair comes to rest abutting the trailing edge of the leading unit said switch is closed. The third switch 84 is actuated by cam 86 which rotates with conveyor bar sprocket shaft 87 hereinafter described, and said switch 84 is so actuated that the conveyor bars 88 will be in proper position to receive a pair of units when said switch is actuated. A fourth switch 85, normally closed, is provided in the path of the leading unit X beyond stops 89 (see Figs. 4 and 5). If, by accident, unit X is turned around so that tongue 131 projects forwardly, then switch 85 is opened and forward progress stopped until unit X is turned around by the operator.

The electrical circuit for actuation of the solenoids 109 which retract the stop members 81 is shown diagrammatically in Fig. 12. Upon closing of switches 82 and 83 by front and rear units X and Y, respectively, and upon closing of switch 84, by timing cam 86 on conveyor shaft 87, two-pole relay 111 is actuated to energize said solenoids 109 and release the units X and Y simultaneously in precise timed relationship so that a conveyor bar 88 will come up behind the trailing unit Y and push the two units X and Y through the gluer and compression units of the machine. It will further be seen from said wiring diagram Fig. 12 that if a tongue 131 contacts switch 85 (by reason of unit X being placed in the machine in the wrong direction), then the electric circuit which energizes the relay 111 is broken until the attendant places unit X in proper direction.

After solenoids 109 are actuated, passage of units X and Y breaks contact at switches 82 and 83 with the result that the circuit energizing said solenoids is broken. Rollers 93 roll along the side panels of units X and hence do not interfere with movement of said units X and Y. Immediately after passage of unit Y, stop member 81 is interposed to prevent passage of the succeeding unit.

Stop members 81 on opposite sides of the machine are identical in construction. A horizontal bar 91 is provided which terminates at its inner end in a yoke shaped member 92, the arms of the yoke being vertically disposed with respect to each other. Rollers 93 are provided to each of the legs of the yoke 92 and said rollers are disposed to bear against the box unit X and hold it against movement except when said bar 91 is retracted, as hereinafter explained. Bar 91 is horizontally disposed within brackets 94 and 96 so that said bar may slide freely within the brackets in a horizontal direction transverse to the direction of movement of the unit through the machine. Bar 91 is biased inwardly by springs 97 which are helical in configuration and surround horizontal stub shafts 98. One end of each of the springs 97 bears against stationary vertical brackets 99 and the opposite end bears against a nut 101 which, in turn, bears against plate 102 to which bar 91 is connected. Thus, the force of springs 97 is transmitted to plate 102 and thence to bar 91 and urges said bar inwardly. Chain 103 is operatively connected to the bar 91 by means of threaded adjustment member 104 which is threaded into the end of bar 91 and thus by screwing the threaded adjustment member 104 into or out of the end of the bar 91 the effective length thereof may be adjusted. Chain 103 passes over idler sprocket 107 and thence is connected to the upper end of the armature 108 of solenoid 109, said solenoid being vertically disposed. Upon energization of said solenoid 109 upon closing of switches 82, 83 and 85 chain 103 is pulled, which retracts bar 91 and thus permits a pair of units to move past stop members 81 into the gluing portion of the machine.

In order to prevent a succeeding unit from following unit Y through the machine upon release of the stop members 81, brake 78 is provided. Said brake 78 is located with respect to stop member 81 a distance rearwardly slightly greater than the length of two units and on one side of the machine. Thus if a succeeding unit should be in place immediately to the rear of unit Y, upon actuation of said brake said succeeding unit will be retarded so as not to follow unit Y into the gluer section. Brake 78, as shown particularly in Figs. 4–6 comprises a rubber-surfaced shoe 112 pivoted at its rearward end on a vertical axis to a stationary plate 113 mounted on the side member 66. A horizontally slidable pin 114 in said plate contacts and moves said shoe inwardly. Said pin 114 is actuated upon actuation on solenoid 109 as follows: Link 116 is directly connected at one end to yoke 92; the opposite end of said link 116 is pivotally connected to one end of rocker arm 117; rocker arm 117 is pivotally mounted intermediate its ends to stationary member 106; the end of rocker arm opposite link 116 bears pin 114. Therefore, retraction of stop member 81 results in inward movement of brake shoe 112 and thus holds up passage of additional units through the machine until stop member 81 is restored to position. Spring 115 biases said shoe 112 outwardly except when brake 78 is actuated. On the side of the machine opposite brake 78 is brace 79 which restrains lateral displacement of a box unit engaged upon actuation of brake 78, the distance between brake 78 and brace 79 being about equal to the width of a box.

In order to insure proper alignment of the units through the unit assembly station, at either side of the machine there are provided horizontal side guides 118 which are spaced apart a distance slightly greater than the width of units X and Y. Said guides 118 are elevated above the surface of rollers 69 a distance about equal to half the height of said units by vertical standards 119 fixed at their lower ends to side members 66. The elevation of said guides 118 is adjustable to accommodate units of different heights and the distance between said guides is also adjustable by reason of horizontal transverse connecting members 120 which are fixed at one end to guides 118 and adjustably held at their other end in brackets 121 carried by standard 119. Adjustment of elevation is accomplished by reason of the fact that brackets 121 are adjustable on standard 119.

*C. Inner top flap closing station*

This section of the machine constitutes a continuation of the station described in the section immediately preceding; except for certain modifications hereinafter mentioned, the structure of this station resembles that corresponding station in Kimball Pat. 2,095,258. Horizontal longitudinally disposed frame members 136 at either side of the machine constitute continuations of the frame members 66 of the preceding station. A roller table 137 is provided to receive units X and Y upon release of stop members 81. This table comprises a plurality of opposed pairs of idler rollers 138 supported from said frame members 136, each said roller revolving upon a stub shaft 139 fixed to table 137. The axes of said shafts 139 are spaced along a line inclined downwardly with respect to the horizontal and the axes themselves are also inclined downwardly in the same fashion as the corresponding rollers shown in Figs. 4 and 6 of Pat. 2,095,258. Hence when a pair of container units is released by the stop members 81 it moves by the force of gravity downwardly, being supported at its side edges by said rollers. This manner of support preserves the downward bending of flaps 129 and 130 and facilitates entry of platen 141, as hereinafter appears.

On each side of the machine is a continuous roller chain 142 contained within tracks 143 affixed to the frame members, 136. Said chains 142 are arranged to be driven at equal speeds by sprockets 144 at opposite sides of the forward end of said machine (see Fig. 3c), said sprockets 144 being fixed to transverse shaft 146 which shaft is, in turn, driven by motor 147 through chain 148. Chains 142 extend the entire length of the folding, gluing, closing and compression stations from said sprocket 144 to sprocket 149 at the rearward end of the flap closing station on shaft 87. The upper stretch of each of said chains 142 is supported by said tracks 143 and the lower stretch of the machine is supported by a plurality of idler sprockets 151 which are freely mounted on vertical supports 152. An adjustable tensioning device 153 as well understood in this art is provided for chain 142. A plurality of transversely-extending conveyor bars 88 is provided, opposite ends of each bar being attached to chains 142 at opposite sides of the machine. Said bars 88 are so positioned that they extend horizontal and normal to the path of travel of the units through the machine. Thus, as the chains 142 move at equal speed the bars 88 move through the machine. Said bars along the upper course of movement are arranged to bear about midway between the top and bottom of a container unit.

In order to insure that the conveyor bars 88 will be maintained exactly perpendicular to the path of the units through the machine, an adjustment is provided to advance or retract one of the chains 142 with respect to the other. Thus, as shown in Figs. 13 and 14 one of the sprockets 144 has an adjoining side plate 158 having a plurality of arcuate slots through which extend screws 157 which are fixed to sprocket 144. Plate 158 is keyed to shaft 146, to which shaft the opposite sprocket 144 is also keyed. Another arcuate slot 155 is cut in side plate 158, through which extends lug 159 welded to sprocket 144. Opposed adjusting screws 160 carried by plate 158 bear against opposite sides of lug 159. Thus by loosening screws 157 and adjusting the angular position of sprocket 144 with respect to plate 158, by the tightening of one screw 160 and the loosening of the other the position of sprockets 144 relative to each other may be adjusted and thereby one conveyor chain 142 may be advanced or retarded with respect to the opposite chain. In this manner the conveyor bars 88 may be squared.

Each conveyor bar 88 moves up behind the trailing container unit Y of each pair and pushes the pair of containers ahead through the inner flap folding, gluing, outer flap closing, and compression stations of the machine. The pairs of container units are restrained against lateral movement by means of horizontal, longitudinally disposed carton guides 161, there being two such guides on each side of the machine, the bottom guides 161(1) being spaced just above the bottom of a container unit and the top guides 161(2) being spaced just below the top of the container unit. The distance between said guides 161 transversely of the machine is substantially equal to the width of the container units. The construction and adjustability of said guides is adequately set forth in said Pat. 2,095,258. In order to prevent the outer flaps 29 and 30 of the container units, which normally are vertically disposed parallel to the path of the container units through the machine, from interfering with the closing of the inner flaps 27 and 28, flap guide 162 is adjustably held in position by means of bolts 163 passing through slots 164 in the cross frame members 166. Flap guides 162 extend from a position adjacent the center of the machine at its rearward end outwardly toward the side of the machine. Thus as flaps 29 and 30 on one side of each unit contact said guide 162 they are moved outwardly to assume a vertical position.

After the pairs of container units have been discharged from the tapered rollers 138 they move onto longitudinal horizontal platen 141 which is of restricted width less than the width of the container units and so positioned and arranged that the leading end thereof is inserted between the outer bottom flaps 129 and 130 and inner bottom flaps 127 and 128 as the container units are moved forwardly by the transverse conveyor bars 88 by reason of the fact that the flaps hang downwardly. See Fig. 6 of said Patent 2,095,258. Thus, the container units and their contents are supported by means of the inner bottom flaps 127 and 128 and the platen 141 on which the inner flaps 127 and 128 rest.

The first step in the closing of the inner top flaps is the closing of the leading inner top flap 27 of the leading container unit X of each pair. This is accomplished by means of folding head 176 which is centrally disposed with respect to the machine. As the leading container unit is pushed along by transverse conveyor bar 88, flap 27 contacts said head 176 and is pressed downwardly to a horizontal position overlying the contents of the container unit. In order to provide for quick closing of flap 27 so that it does not interfere with rotation of flap closing arm 171, said head 176 is provided with a roller 177 at one side arranged quickly to close flaps 27. Said roller 177 is held in position by nut 178 which is threaded over stud 179 extending from pivoted adjustment plate 181 which is in turn supported by bracket plate 182. Pivoted adjustment plate 181 is pivoted at about its midpoint on bolt 183 and its end opposite stud 179 is provided with a slot 184 through which passes bolt 186. Bolts 183 and 186 are threaded into plate 182. Thus by adjusting the position of the slot 184 with respect to bolt 186, the height of the roller 177 may be adjusted. Roller 177 is arranged to engage flap 27 of the leading container unit X and quickly close it so as to assume a horizontal position. See Figs. 15 and 16.

At the same time that the leading flap 27 of leading unit X is being closed, the trailing flap 28 of the leading unit X is being closed by first flap closing arm 171. See Fig. 17. Said arm 171 is supported and rotated by a revolving disk 191 and is so positioned that its shank 192 extends radially outwardly from said disk and its arcuate portion 193 has its radius of curvature concentric with said disk 191. The outward projection of arm 171 may be adjusted by reason of shank 192 being received in sleeve 195 on disk 191 and adjustably held by set screw 195a.

Disk 191 is mounted upon bracket 194 by means of bolt 196, said bracket 194 being connected to a stationary portion of the machine. An adjustable clutch 197 is provided between disk 191 and sprocket 198 so that the timing of the flap closing arms 171 and 172 may be adjusted. Sprocket 198 is driven by chain 199 which, in turn, passes over sprocket 201 on shaft 202 to which is connected gear 203 which is driven by gear 204 through the instrumentality of chain 206 passing over sprocket 207 on shaft 87 which bears conveyor chain sprocket 149. Thus, it will be seen that the rotation of disk 191 is in carefully timed relationship with respect to the advancement of the conveyor bars 88 through the machine.

Figure 8:
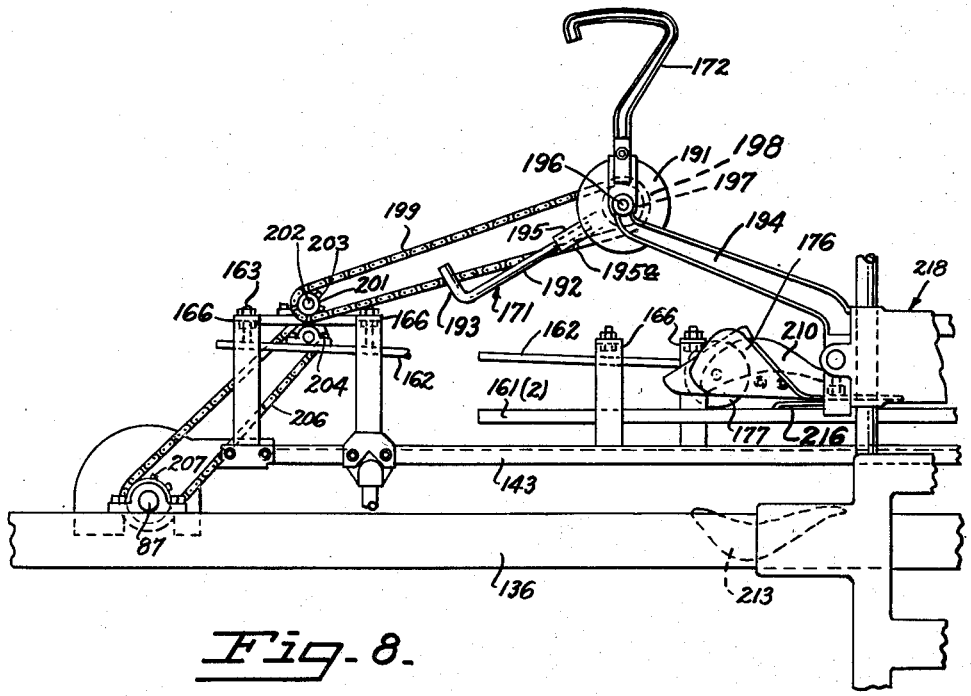
Fig. 8 is a side elevation of the inner top flap closing station and adjacent mechanism.

As has been stated, leading flap 28 of unit Y is notched out as indicated by reference numeral 33 and this makes possible the movement of flap closing arm 171 as best illustrated in Fig. 17. The progress of the arm 171 is not impeded by flap 28 of unit Y because of the notched portion 33 and hence the flap 28 of unit X may be closed by the flap closing arm 171, as flap 27 of unit X is being closed by roller 177. It will be understood that the plane of rotation of arm 171 is at the back of the machine as viewed in Fig. 8 and so positioned that arm 171 will pass through notch 33.

Further progress of the pairs of container units through the machine results in the closing of the flap 28 of unit Y by roller 177 and head 176 as the pairs of units are advanced through the machine.

The remaining flap 27 of unit Y is closed by the second flap closing arm 172 likewise mounted on disk 191. Arm 172 is spaced angularly with respect to arm 171 and so arranged that after arm 171 has closed flap 28 of unit X, second arm 172 is in position to close flap 27 of unit Y. Clearance is provided between head 176 and bracket 182 for rotation of arm 172. (See Fig. 16.)

The cooperative action of head 176 and roller 177 and the rotation of arm 171 and second arm 172 results in the closing of the inner flaps 27 and 28 of each of the units X and Y.

D. *Top and bottom outer flaps unfolding station*

The next step in the progress of the pairs of containers units through the machine is the folding outward of outer top flaps 29 and 30 and the folding outward of outer bottom flaps 129 and 130. Carton guides 161 are so disposed that the upper edges of upper guide 161(2) coincide with the score line at which the outer top flaps 29 and 30 are attached to the sides 21 and 23, and at the lower edge of lower guide 161(1) coincides with the score line at which the outer bottom flaps 129 and 130 are atached to the sides 21 and 23. Thus, the carton guides 161 provide a support along which the top and bottom flaps may be folded backward away from the unit.

The folding backward of the flaps is accomplished by means of four plowshares or horns 210, 211, 212, and 213, a pair of said plowshares being disposed to fold backward the outer bottom upper plowshares 210 and 211 at each side of the machine being arranged to fold backward the outer top flaps 29 and 30, and the bottom plowshares 212 and 213 at each side of the machine being disposed to fold backward the outer bottom flaps 129 and 130. The shape and function of said plowshares is well understood in this art and a detailed description thereof is deemed unnecessary. See especially Pat. 2,095,258. However, it may be stated that the point of each plowshare moves inside the leading edge of the flaps 29, 30, 129, or 130 as the container units are moved through the machine by the transverse conveyor bars 88, and that by reason of the curved or warped configuration of said plowshares, the flaps are bent outwardly and extending horizontally away from the container. After the flaps have assumed a horizontal position, they are supported in said horizontal relationship by pressure plates 216 on their upper and lower surfaces.

E. *Gluing station*

As the containers pass through the gluing portions 218 of the machine, pairs of revolving rollers 219 at each side of the machine coated with liquid glue contact the undersurfaces of the outer top and bottom flap members 29, 30, 129, and 130 and apply a strip of glue to said undersurfaces. This structure is illustrated in Pat. 2,095,258. Cams 934 of said reference are preferably not used and glue is applied continuously instead of discontinuously.

F. *Outer flap refolding station*

After the glue has been applied, the outer flaps 29, 30, 129, and 130 are folded back to normal position so as to overlie the inner flaps 27, 28, 127, and 128, the inward folding movement being accomplished by means of a second series of four plowshares or horns 221, and 222 and two additional plowshares of complementary shape on opposite sides of the machine (not shown) similar in appearance to those shown in Fig. 3b, two on each side of the machine, and comprising an upper and a lower plowshare for the upper and lower outer flaps, respectively. The configuration and function of the second set of plowshares is likewise well known in this art and a detailed description thereof is deemed unnecessary. See Pat. 2,095,258. After the outer flaps are positioned overlying the inner flaps the glue on the under surfaces of said outer flaps causes adherence between the outer and inner flaps, and thus seals the top and bottom of each of the container units. The individual units of each pair of containers are held together by reason of the fact that glue has likewise been applied to the undersurfaces of tongues 31 and 131 which tongues overlie the portion of flaps 28 and 128 which are exposed by reason of cutting away of the recesses 32 and 132 in the flaps 30 and 130.

It will be understood, however, that the liquid glue which has been applied to the undersurfaces of the outer flaps does not set immediately, and hence the units X and Y of each pair must be held in abutting position with their edges square and subjected to compression in order to insure that the proper alignment of the two units of each pair will be maintained until the glue has set sufficiently.

The transverse conveyor bars 88 move the pairs of container units longitudinally of the machine between opposed horizontal closing plates 231 and 232 centrally disposed and extending longitudinally of the machine, one plate 232 being at the bottom of the machine and the other plate 231 being at the top and spring biased downwardly by spring 229. Said plates act to apply pressure to the top and bottom of the units after the outer flaps have been refolded and thus begin the application of compressive force to the containers, which force is continued in the compression unit which is immediately behind the gluing unit. In order to position the containers centrally laterally of the machine, a plurality of flanged rollers 233 is provided with their axes disposed vertically. Said rollers revolving on stub shafts 234 which are fitted into carton guide members, 161(1) and 161(2), said guide members being spring biased inwardly by means of springs 236 surrounding stub shafts 237, one end of said stub shafts 237 being fixed to said guide members 161 and the opposite end of each shaft 237 being held within brackets 238 fixed to stationary portions of the machine. Thus, the flanges of the upper set of rollers 233 engage the top of the box units and the cylindrical portions of said rollers engage the upper side edges of the container and the flanges 239 of the bottom set of rollers 233 engage the bottom of the box units and the cylindrical portions of said rollers engage the lower side edges of the containers. Hence the rollers 233 maintain units Y and X in alignment laterally. The closing plate 231 extends to a point immediately adjacent the compression unit. The lower closing plate 232 picks up the boxes upon discharge from platen 141 and carries the units to the compression unit. In order to insure closing of the bottom flaps 129 and 130 a bifurcated curved support 241 is provided, the rearward and lowermost parts of the arms 242 being disposed about one-quarter of the way inward from the sides and engaging said flaps, particularly the flaps of unit Y and bringing them upward to be supported on bottom closing plate 232. A medial vertical fin 243 is provided at this portion of the machine to prevent overlapping of flaps 129 and 130 and to assist in squaring up the cases. See Fig. 18.

G. First compression station

The compression unit which is used in conjunction with the present machine resembles standard compression units in common use at the present time with certain modifications necessitated by reason of the fact that this machine is designed to move a pair of container units together. In conventional compression units there is provided a top and bottom continuous belt, the bottom belt being driven and adapted to carry the cases through the compressor. The instant machine differs from conventional ones in that the pairs of units are conveyed through a first compression unit by means of the same transverse conveyor bars 88 which convey the units through stations C to F. It will be understood that said transverse conveyor bars 88 are moved by the longitudinally extending continuous chains 142 at either side of the machine. This insures that the container units X and Y as they are conveyed through the compression unit by the bars 88 will remain abutting until the glue has set. The upper and lower belts 251 and 252 between which the container units are moved are free to move longitudinally of the machine and are supported by a plurality of transverse horizontal rollers 253 which are journalled in the frame members 254 of the compression unit. Said rollers 253 are spaced closer together on the bottom stretch than in conventional compression units to eliminate up-and-down movement. The upper set of rollers 253 are spring biased downwardly by springs 255 to apply pressure on the tops of the containers, as in conventional compression units.

Spring loaded squaring rolls 256 are positioned to both sides of the first section of the compression unit and adjacent the top and bottom edges of the boxes. Said squaring rolls have vertical axes and are supported by horizontal members 257 slidably received in horizontal sleeves 258 with springs 259 urging said squaring rolls 256 inwardly. Upper members 258 are, in turn, adjustably connected to vertical rods 261 by brackets 262 so that inward and outward position of members 256 may be adjusted. Brackets 263 receive rods 261 and are adjustable so that the elevation of upper square rolls 256 may be adjusted.

Lower rolls 256 likewise have their axes vertical and held by horizontal rods 264 received slidably in sleeves 265 with springs 265a biasing said rollers inwardly.

It will be observed that in order to maintain substantially horizontal movement of the container units through the entire machine without vertical movement which might tend to separate the units one from the other, the compression unit is positioned as closely adjacent the gluer as possible. This close spacing insures that the bottom of the container units will be supported almost continuously and thus eliminate the tendency of the container to break apart.

H. Second compression station

As has been stated, the first compression unit which is positioned immediately adjacent the gluer is not power driven but on the contrary the cases are moved through this unit by means of transverse conveyor bars 88. Immediately following the first compression station G is a second compression station H and it will be understood that said second compression station H may be of standard construction in that the lower belt 266 is power driven and the cases are conveyed through said second compression unit by means of said lower belt. After the container units have passed through the first compression unit the glue is fairly well set, but an unevenness of transfer tends to break the cases apart. In order to insure evenness of transfer, a limit switch 267 is installed in such position that the front end of the leading unit X contacts said switch as soon as the back end of unit Y is released from belts 251 and 252. The adjacent ends of belts 252 and 266 are spaced apart a distance greater than the combined lengths of units X and Y. Said limit switch closes and starts the bottom belt 266 of the conventional compression unit. The bottom belt carries the two container units of each pair together through the second compression station. In order to facilitate transfer from the first compression station to the second, the bottom belt 266 is extended rearwardly. See Figs. 3c and 20. It should be understood that the timing of the starting of belt 266 is such that the back end of the trailing container unit must be free from the first compression unit before the bottom belt of the second compression unit begins to move so that there is no tendency of the two units to be pulled apart. Further, horizontal flap depressers 268 are provided to engage and hold down flaps 29 and 30 during transfer from station G to station H. Said depressers 268 are horizontal, transverse rollers mounted in brackets 270 which are mounted on a horizontal, transverse axis to a stationary portion of station G. Depressers may rock upward as shown by dotted lines in Fig. 20 to facilitate passage of the leading ends of unit X, but by reason of gravity tend to hold down the top outer flaps. An idler roller 269 is also provided in advance of lower belt 266 to engage the bottom of the units and assist in holding them level during transfer.

After the container units have passed through the second compression unit and such additional compression units as may be received, the glue has set sufficiently for handling the two units of a pair without danger of separation.

*Method of operation*

The method which is the subject of this invention involves the performance of the following steps, it being understood that one or more of the steps may be omitted and two or more of the steps may be combined into a single step:

A. *Packing.*—This is a conventional step which involves the filling of each unit of the several pairs of container units with cans, jars, or the like. The units are first formed into rectangular shape and the bottoms temporarily formed without gluing by first folding inward the bottom inner flaps and then the bottom outer flaps. The units are filed in any convenient manner. The filled units are then deposited on a moving belt and conveyed into the machine, it being understood that the attendant places the first unit of each pair with projecting tongues extending rearwardly and the second unit of each pair with the projecting tongues extending forwardly.

Figure 21:
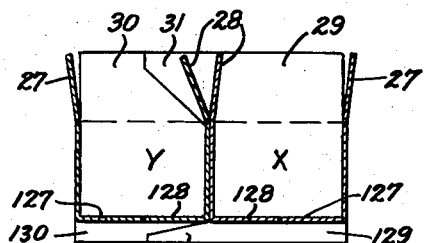

B. *Assembling.*—In this step the pairs of units are brought together so that the rearward panel of the leading unit and the forward panel of the second unit are tight together and the side edges of the two units are square. The leading unit is stopped until the second unit is in proper place behind it; then the two units of the pair are released simultaneously in proper timed relationship to be picked up for movement through the subsequent steps. Provision is made so that there is no release if the leading unit is turned in the wrong direction. The units are grouped as shown in Fig. 21 after this step.

Figure 22:
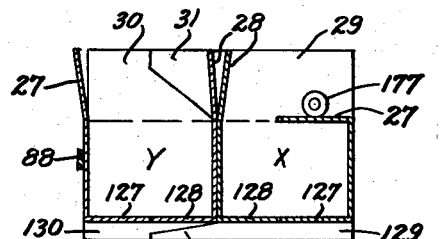
Figure 23:
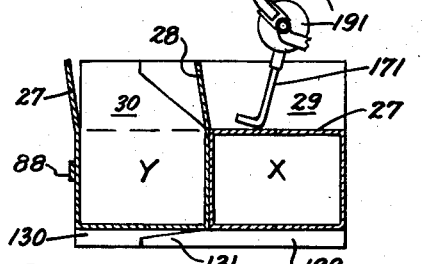
Figure 24:
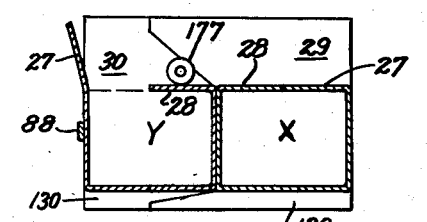
Figure 25:
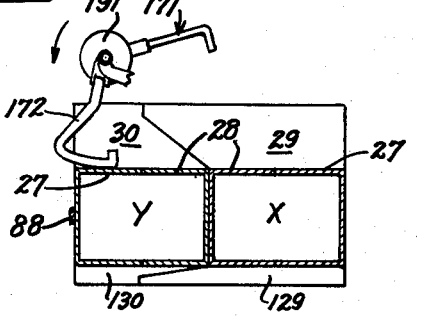

C. *Closing inner top flaps.*—The pairs of units are moved forwardly by being pushed from the rear. The units are supported by a platen on which the inner bottom flaps rest. There are four inner top flaps in a pair of units, and these are closed sequentially. The leading inner top flap of the leading unit is first pressed down rearwardly. Fig. 22 shows the accomplishment of this operation. The trailing inner top flap of the leading unit is then pushed down forwardly, the arm 171 clearing through cut out portion 33 of flap of the second unit, as shown most clearly in Fig. 17. Fig. 23 shows the completion of this operation. The leading inner top flap of the second unit is then pressed down rearwardly. Fig. 24 shows the completion of this operation. Finally the trailing inner top flap of the second unit is pushed down forwardly, the units thereupon having assumed the position shown in Fig. 25. The inner top as well as the inner bottom flaps have been closed at the end of this step.

D. *Unfolding top and bottom outer flaps.*—By means of conventional horns or plowshares the outer flaps are folded outwardly. Reference is made to said Pat. No. 2,095,258 for the performance of this step, and particularly to Fig. 10 of said reference.

E. *Gluing.*—Glue is applied to the undersurfaces of all of the outer flaps.

F. *Refolding of outer flaps.*—By means of conventional horns or plowshares the outer flaps are folded inwardly to overlie and adhere to the inner flaps. See Figs. 12 to 15, inclusive, of said Pat. No. 2,095,258. It will be understood that the projecting tongues of the units overlap the opposite unit and fit into the complementary recesses in the top flap of said opposite unit. The glue on the underside of the tongue adheres to the exposed inner flaps under the recess. Upon setting of the glue, the two units of the pair are locked together by means of the projecting tongues. See Fig. 2.

Figure 26:
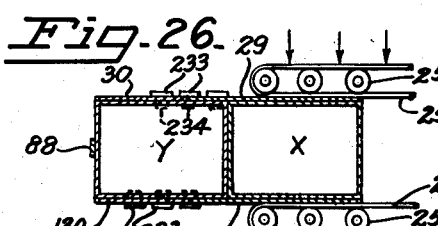
Figure 27:
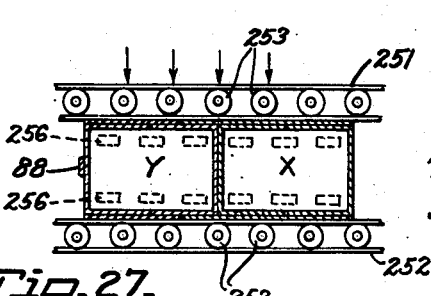

G. *Initial compressing.*—Setting of the glue is not instantaneous. Therefore compression must be applied until the glue has set sufficiently for further handling. In the first compression unit the pairs of units are pushed by force applied to the rear of the second unit. Transfer into this step is shown in Fig. 26, it being understood that the units must be kept level at all times to prevent the units of the pairs working apart. Pressure is applied from the top and the bottom is held firm. Pressure is also applied inwardly from the sides to keep the side edges square. Passage through this step is shown in Fig. 27.

Figure 28:
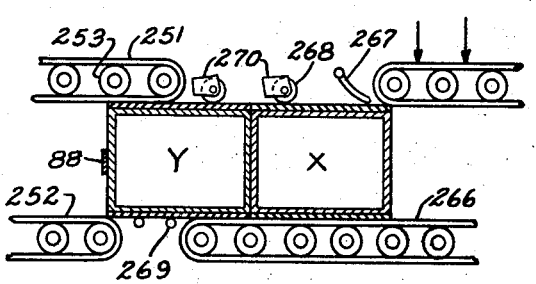

H. *Second compressing.*—Further compression is applied to the top in order to facilitate setting of the glue. During this stage the pairs of units are moved forwardly by means of moving belts as in conventional machines. Provision is made for level transfer from the first to the second compression stage. See Fig. 28. An electrical circuit is established such that the belt of the second compression stage moves forward only after the pair of units has cleared the first compression unit so that there is no tendency to pull the units apart. Fig. 28 illustrates passage of the units through the second compressing step. Thereafter the units may be handled as desired.

It will be noted as a matter of terminology that in the claims switch 85 is referred to as the "third" switch, and switch 84 is referred to as the "fourth" switch.

Although the present invention has been described in some detail by way of illustration and example, it is understood that certain changes and modifications may be made within the spirit of the invention and scope of the appended claims.

I claim:

1. Machinery for use in closing pairs of interlocking container units having transversely extending inner flaps and longitudinally extending outer flaps, at least one of said outer flaps having a projecting tongue comprising first means for assembling pairs of units with the trailing panel of the first unit abutting the leading panel of the second unit, second means for advancing the assembled pairs of units, third means for folding glued outer flaps over said inner flaps with said projecting tongue of one unit overlying the other unit, and fourth means for applying compressive force to said pairs of units during drying of the glue during action of said second means.

2. Machinery for use in closing pairs of interlocking container units having transversely extending inner flaps and longitudinally extending outer flaps, at least one of said outer flaps having a projecting tongue comprising first means for assembling pairs of units with the trailing panel of the first unit abutting the leading panel of the second unit, second means for advancing the assembled pairs of units, third means for closing each of the transversely extending inner flaps of each unit, fourth means for folding glued outer flaps over said inner flaps with said projecting tongue of one unit overlying the other unit, and fifth means for applying compressive force to said pairs of units during drying of the glue during action of said second means.

3. Machinery as defined in claim 1 in which said second means advances said units both through said third and fourth means.

4. Machinery as defined in claim 2 in which said second means advances said units through said thrid, fourth and fifth means and which further comprises sixth means driven by said second means and driving said third means in timed relation to movement of said second means.

5. Machinery for closing interlocking groups of container units of a predetermined number having transversely extending inner flaps and longitudinally extending outer flaps, an outer flap of at least one of said units having a projecting tongue comprising, assembly means having stop means for restraining forward motion of the leading unit of each group and actuating means for holding said stop means inoperative responsive to the presence adjacent said leading unit of a predetermined number of other units constituting the desired group, means for advancing said groups of container units beyond said assembly means, at least one conveyor member, means for advancing said conveyor member in a position behind the rear unit of each said group of said units and pushing said group forwardly, inner top flap folding means, gluing means for applying glue to the outer flaps and the projecting tongue of one unit, outer flap folding means to glue said inner and outer flaps together and the projecting tongue of one unit to the adjacent unit, and compression means for applying compressive force until the glue has set, said conveyor member being arranged to advance each said group through said compression means, said flap folding means and said gluing means.

6. Machinery as defined in claim 5 wherein said assembly means and said means for advancing said conveyor member are operated in timed relation such that said conveyor member will be moved into position behind the trailing unit of each said group of units in timed relation to the advancement of said group.

7. Machinery as defined in claim 5 wherein a brake is provided along the path of travel of said units through said assembly means to restrain any unit in excess of the predetermined number of units in said group from advancing through said assembly means.

8. Machinery as defined in claim 5 wherein second compression means are provided to apply pressure for additional time until the glue has further set, said second compression means including conveying means independent of said conveyor member.

9. Machinery as defined in claim 5 wherein second compression means are provided to apply pressure for additional time until the glue has further set, said second compression means including conveying means independent of said conveyor member, and wherein a level support is provided to hold said units level during transfer from said first to said second compression means.

10. Machinery as defined in claim 5 wherein are provided second compression means to apply pressure for additional time until the glue has further set, said second compression means including conveying means independent of said conveyor member, a level support to hold said units level during transfer from said first to said second compression means, said first and second compression means being spaced apart a distance greater than the length of said group of units, and means for causing motion of said conveying means of said second compression means after the rearmost unit has become disengaged from said first compression means.

11. Machinery as defined in claim 5 wherein are provided second compression means to apply pressure for additional time until the glue has further set, said second compression means including conveying means independent of said conveyor member, and means to apply force inwardly against the sides of said units during passage through said compression units.

12. A method of forming a multiple unit container comprising, providing a pair of container units, said units having inner and outer closing flaps, at least one of said units being formed with one of its outer flaps having a projecting integral tongue adapted to overlie the other unit of the pair, applying adhesive to some of said flaps of said units, and folding outer flaps of said units over the inner flaps so that the adhesive holds said flaps together and said tongue on one unit overlies the other unit and is joined thereto by said adhesive and holds said units together.

13. A method of packaging merchandise comprising, providing a pair of container units each having top and bottom inner and outer closing flaps, at least one of the outer flaps of one of said units having a projecting tongue adapted to overlie a portion of the other unit, forming a temporary bottom for each unit by folding inward the bottom inner and outer flaps, filling said units, assembling said units in juxtaposed pairs with the adjacent units abutting with said projecting tongue extending over the outline of said other unit, folding inward the top inner flaps of each unit, folding outward the top and bottom outer flaps of each unit, applying adhesive to the undersurfaces of said top and bottom outer flaps, including the undersurface of said tongue, and folding inward said top and bottom outer flaps and said tongue over said other unit.

14. A method of packaging merchandise comprising, providing a pair of container units each having top and bottom inner and outer closing flaps, at least one of the outer flaps of one of said units having a projecting tongue adapted to overlie a portion of the other unit, forming a temporary bottom for each unit by folding inward the bottom inner and outer flaps, filling said units, assembling said units in juxtaposed pairs with the adjacent units abutting with said projecting tongue extending over the outline of said other unit, folding inward the top inner flaps of each unit, folding outward the top and bottom outer flaps of each unit, applying adhesive to undersurfaces of said top and bottom outer flaps, including the undersurface of said tongue, and folding inward said top and bottom outer flaps and said tongue over said other unit, and applying compressive force against the top and sides of said units while advancing said units by pushing from the rear.

15. A method of forming multiple unit containers comprising, providing a pair of container units each having top and bottom inner and outer closing flaps, at least one of the outer flaps of one of said units having a projecting tongue adapted to overlie a portion of the other unit, assembling pairs of units with opposed side panels abutting, holding said pairs in assembled relation, releasing said pairs, advancing said pairs by pushing against the rear of the rear unit in each pair, closing said inner flaps, applying adhesive in zones to subsequently join said outer flaps to said inner flaps and said tongue to said other unit, and closing said outer flaps to overlie said inner flaps and said tongue to overlie said other unit.

16. A method of forming multiple unit containers comprising, providing a pair of container units each having top and bottom inner and outer closing flaps, at least one of the outer flaps of one of said units having a projecting tongue adapted to overlie a portion of the other unit, assembling pairs of units with opposed panels abutting, holding said pairs in assembled relation, releasing said pairs, advancing said pairs by pushing against the rear of the rear unit in each pair, closing said inner flaps, applying adhesive in zones to subsequently join said outer flaps to said inner flaps and said tongue to said other unit, and closing said outer flaps to overlie said inner flaps and said tongue to overlie said other unit, and applying compressive force until said adhesive has at least partially set while continuing advancement by pushing against the rear of the rear unit.

17. The method defined in claim 16 in which the forward flap of the trailing unit is notched out and in which the step of closing said inner flaps comprises, closing the forward inner flap of the leading unit by pushing said leading inner flap rearwardly, closing the rearward inner flap of the leading unit by pushing said last-mentioned flap forwardly through the notched portion of the forward flap of the trailing unit, closing the forward inner flap of the trailing unit by pushing said last-mentioned flap rearwardly, and closing the rearward inner flap of the trailing unit by pushing said last-mentioned flap forwardly.

18. A method of packaging articles of merchandise in a multiple container unit group comprising, providing a plurality of blanks for said units, said blanks when formed into box units having transversely extending inner and longitudinally extending outer top flaps, at least one of said outer flaps of one unit having a projecting tongue adapted to overlie an adjacent unit, forming each of said blanks into an open top box unit, filling each of said units with articles of merchandise, placing a plurality of filled units of a group on a conveyor with the leading unit of said group arranged so that its tongue projects toward the following unit of said group, conveying said units to an assembly station, assembling said group of units with opposed side panels abutting, holding said group in assembled relation, releasing said group, advancing said group by pushing against the rear of the rear unit in each group, closing said inner flaps, applying adhesive in zones to subsequently join said outer flaps, to said inner flaps and said tongue to said other unit, and closing said outer flaps to overlie said inner flaps and said tongue to overlie said other unit.

EDWARD N. BURNETT.

References Cited in the file of this patent

UNITED STATES PATENTS

| Number | Name | Date |
| --- | --- | --- |
| 1,567,165 | Noland | Dec. 29, 1925 |
| 1,752,540 | Olson | Apr. 1, 1930 |
| 1,987,500 | Wild | Jan. 8, 1935 |
| 2,263,739 | Rose | Nov. 25, 1941 |
| 2,286,523 | Whitehead | June 16, 1942 |
| 2,324,401 | Kimball | July 13, 1943 |
| 2,328,758 | Vergobbi | Sept. 7, 1943 |
| 2,391,708 | Johnson | Dec. 25, 1945 |
| 2,415,292 | Lamb | Feb. 4, 1947 |
| 2,456,059 | Grupe | Dec. 14, 1948 |
| 2,485,235 | Graf | Oct. 18, 1949 |
| 2,549,281 | Armstrong | Apr. 17, 1951 |